United States Patent [19]
Obitsu et al.

[11] Patent Number: 4,680,598
[45] Date of Patent: Jul. 14, 1987

[54] CHROMOGENIC MATERIALS EMPLOYING FLUORAN COMPOUNDS

[75] Inventors: Takeo Obitsu, Ohmiya; Tetsuo Igaki, Kawagoe; Kimiaki Kinoshita, Kitamoto; Morio Nanbu, Fujimi; Shinichi Satoh, Tokyo, all of Japan

[73] Assignee: Shin Nisso Kako Co., Ltd., Japan

[21] Appl. No.: 849,759

[22] Filed: Apr. 8, 1986

[30] Foreign Application Priority Data

Apr. 18, 1985 [JP] Japan .................................. 60-81361
Feb. 21, 1986 [JP] Japan .................................. 61-35094

[51] Int. Cl.$^4$ ........................ B41M 5/16; B41M 5/18; B41M 5/22
[52] U.S. Cl. .................................. 503/217; 503/221; 503/225; 503/226; 427/151
[58] Field of Search ............... 346/204, 217, 221, 225, 346/216; 427/151, 150, 152; 549/225

[56] References Cited

U.S. PATENT DOCUMENTS 4,590,498  5/1986  Yahagi et al. ...................... 346/221
4,612,558  9/1986  Anzai et al. ........................ 346/221
4,613,879  9/1986  Yahagi et al. ...................... 346/221

*Primary Examiner*—Bruce H. Hess
*Attorney, Agent, or Firm*—Abelman Frayne Rezac & Schwab

[57] ABSTRACT

The fluoran compounds of the formula (I) are new red color forming chromogenic dyes.

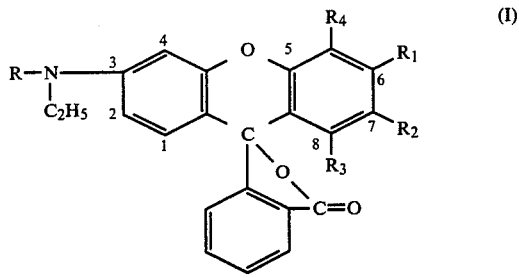

wherein R represents an isobutyl or isopentyl group, $R_1$ represents a hydrogen or halogen atom or an alkyl group, $R_2$ represents a hydrogen or halogen atom or an alkyl group, $R_3$ represents a hydrogen atom, and $R_4$ represents a hydrogen atom, or $R_4$ and $R_1$ as well as $R_2$ and $R_3$ taken together with the carbon atoms to which they are attached may form a benzene ring which may be substituted with a halogen atom. They are used, together with an acidic developer, in chromogenic recording materials for use in pressure sensitive copying paper, heat-sensitive recording paper and thermo-sensitive, reversible color changing composition.

58 Claims, 1 Drawing Figure

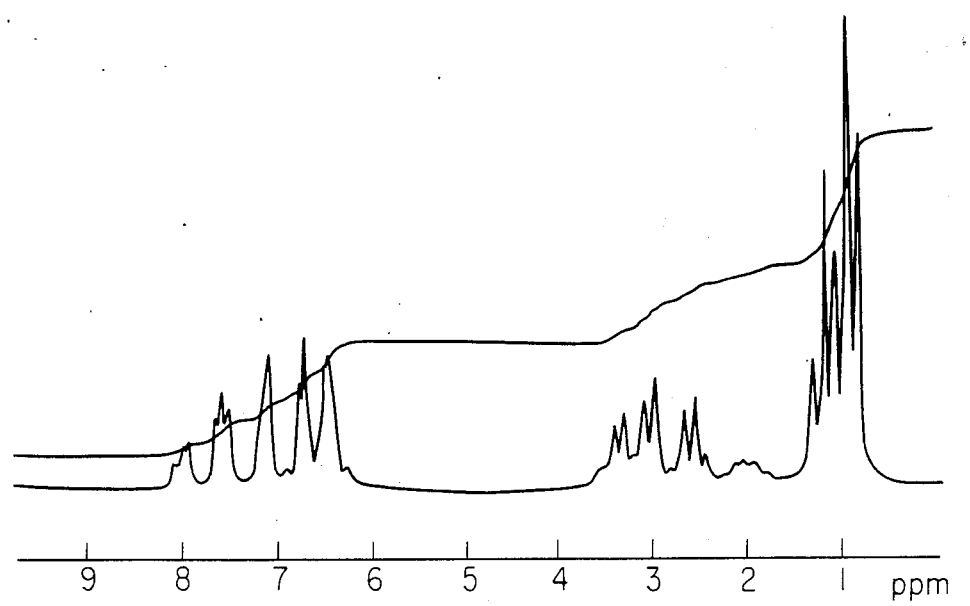

CHROMOGENIC MATERIALS EMPLOYING FLUORAN COMPOUNDS

FIELD OF THE INVENTION

This invention relates to red color forming chromogenic fluoran compounds which exhibit excellent color forming performance by the action of acidic substances brought into intimate contact therewith and to chromogenic recording materials comprising the same.

BACKGROUND OF THE INVENTION

At present, recording materials which comprise chromogenic dyes which are colorless or substantially colorless in themselves but form colors by the action of acidic substances brought into intimate contact therewith (said dyes are hereinafter called "chromogenic dyes") and said acidic substances (color developers) which permit said chromogenic dyes to form colors have been extensively used for, e.g., pressure-sensitive copying papers, heat-sensitive recording papers and the like. Keeping pace with the speeding-up of the services of communication recording devices such as facsimile, it is desired that the color developing speed of the heat-sensitive recording papers used in facsimile is accelerated. For heat-sensitive recording papers for use in facsimile, there have been mostly used black color forming chromogenic dyes. However, res color forming chromogenic dyes are sometimes used in admixture with the black color forming chromogenic dyes in order to effect tone adjustment of formed color from said black color forming chromogenic dyes used. On that account, it is desired that the red color forming chromogenic dyes as well as the black color forming chromogenic dyes are improved in chromogenic characteristics thereof.

Heretofore, 3-diethylamino-6-methyl-7-chlorofluoran of the formula,

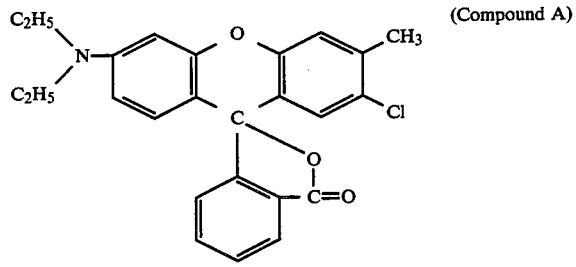

(Compound A)

(Japanese Patent Publn. No. 4701/1972)

3-diethylamino-7-chlorofluoran of the formula,

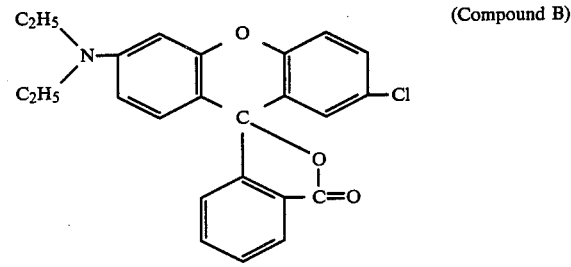

(Compound B)

(Japanese Patent L-O-P Publn. No. 46578/1973)

or 3-diethylamino-7,8-benzofluoran of the formula,

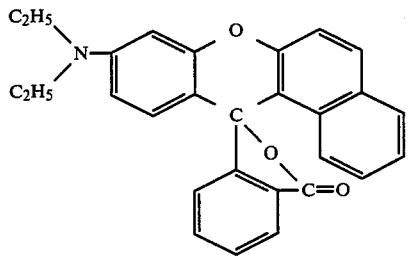

has preferably been used as a red color forming chromogenic dye for use in tone adjustment of the black color forming chromogenic dyes.

SUMMARY OF THE INVENTION

Now, we have found that the fluoran compounds represented by the formula (I) are red color forming chromogenic dyes excellent in chromogenic characteristics.

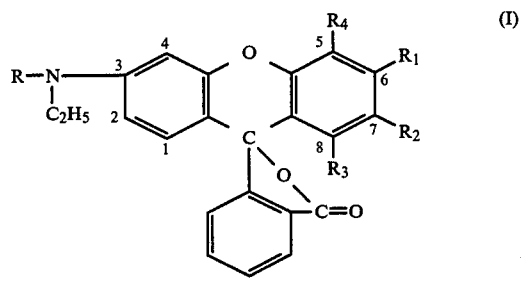

(I)

wherein
R represents an isobutyl group or an isopentyl group,
$R_1$ represents a hydrogen or halogen atom or an alkyl group,
$R_2$ represents a hydrogen or halogen atom or an alkyl group,
$R_3$ represents a hydrogen atom, and
$R_4$ represents a hydrogen atom, or $R_4$ and $R_1$ as well as $R_2$ and $R_3$ taken together with the carbon atoms to which they are attached may form a benzene ring optionally substituted with a halogen atom.

BRIEF DESCRIPTION OF THE DRAWINGS

The FIGURE is NMR spectrum of 3-N-isobutyl-ethylamino-6-ethylfluoran.

DETAILED DISCLOSURE OF THE INVENTION

The fluoran compounds represented by the formula (I) are prepared by reacting in sulfuric acid one mole of a benzoic acid derivative represented by the formula

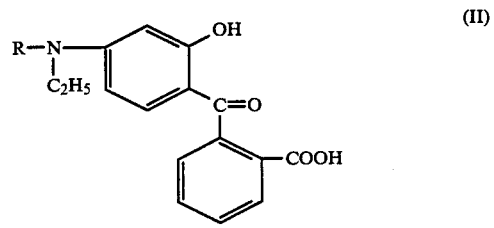

(II)

wherein R is as defined above, with approximately one mole of a phenol derivative of the formula

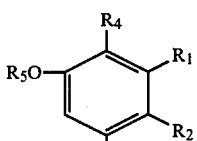

(III)

includes those of 1-8 carbon atoms which may be branched.

Typical examples of the compounds represented by the formula (I) thus prepared are shown together with their respective physical properties in Table 1.

TABLE 1

| Compound No. | R | R₄ | R₁ | R₂ | R₃ | Melting point (°C.) | Developed Color |
|---|---|---|---|---|---|---|---|
| 1 | CH₃\CH—CH₂—/CH₃ | H | CH₃ | Cl | H | 186.2~187.8 | Vermilion |
| 2 | CH₃\CH—CH₂—/CH₃ | H | H | Cl | H | 149.1~150.6 | Vermilion |
| 3 | CH₃\CH—CH₂—/CH₃ | H | Cl | Cl | H | 155.6~158.0 | Vermilion |
| 4 | CH₃\CH—CH₂—/CH₃ | H | H | CH₃—CH₂—C(CH₃)(CH₃)— | H | 185.0~186.4 | Vermilion |
| 5 | CH₃\CH—CH₂—/CH₃ | H | H | —CH=CH—CH=CH— | | 192.7~193.7 | Pink |
| 6 | CH₃\CH—CH₂—/CH₃ | H | H | —CH=CH—C(Br)=CH— | | 188.0~189.8 | Pink |
| 7 | CH₃\CH—CH₂—CH₂—/CH₃ | H | CH₃ | Cl | H | 156.5~159.0 | Vermilion |
| 8 | CH₃\CH—CH₂—CH₂—/CH₃ | H | H | Cl | H | 149.0~151.0 | Vermilion |
| 9 | CH₃\CH—CH₂—/CH₃ | H | C₂H₅ | H | H | Difficult to crystallize | Vermilion |
| 10 | CH₃\CH—CH₂—/CH₃ | —CH=CH—CH=CH— | | H | H | 158.8~160.7 | Pink | wherein R₁, R₂, R₃ and R₄ are as defined above, and R₅ represents a hydrogen atom or a lower alkyl group. The concentration of sulfuric acid used is preferably 80% or higher, and the reaction is carried out at a temperature of 100°-120° C. for 4-8 hours, whereby the end products can be obtained.

In the formulas (I) and (III), the alkyl group as R₁ preferably includes those of 1-6 carbon atoms, which may be branched, and the alkyl group as R₂ preferably Tables 2 and 3 respectively show a comparison of chromogenic characteristics between the present novel fluoran compounds and the conventionally used red color forming fluoran compounds when they are applied to heat-sensitive recording papers.

TABLE 2

| Heat-sensitive recording paper | Color development temperature (°C.) | | | | | | |
|---|---|---|---|---|---|---|---|
| | 95 | 100 | 110 | 120 | 130 | 150 | 180 |
| I (Example 11) | 0.08 | 0.11 | 0.15 | 0.35 | 0.78 | 0.99 | 0.99 |
| II (Comparative Example 1) | 0.08 | 0.10 | 0.12 | 0.19 | 0.50 | 0.94 | 0.98 |

TABLE 3

| Heat-sensitive recording paper | Color development temperature (°C.) | | | | | | |
| --- | --- | --- | --- | --- | --- | --- | --- |
| | 85 | 90 | 95 | 100 | 110 | 120 | 130 |
| III (Example 12) | 0.01 | 0.22 | 0.60 | 0.88 | 0.94 | 0.97 | 0.95 |
| IV (Comparative Example 2) | 0.08 | 0.12 | 0.40 | 0.84 | 0.91 | 0.90 | 0.93 |

In Table 2, the values indicate color densities, at the respective temperatures, of the heat-sensitive recording papers made in Example 11 and Comparative Example 1. Similarly, the values in Table 3 indicate color densities, at the respective temperatures, of heat-sensitive recording papers made in Example 12 and Comparative Example 2. For the color development, a Dry Heating Tester (manufactured and sold by Kishino Science Machinery Co., Ltd.) was used for heating. The color density was measured using the Macbeth reflection densitometer. Larger values for the color density show deeper hues of color.

It is evident from the results in Tables 2 and 3 that the fluoran compounds of the present invention possess excellent color development performance under the influence of heat in comparison with red color forming chromogenic fluoran compounds used conventionally.

Further, the present compounds are markedly high in solubility in organic solvents in comparison with the known red color forming chromogenic fluoran compounds as mentioned above. This property is of great advantage to the present compounds when they are used in pressure-sensitive copying papers.

As is clear from the foregoing, the present compounds represented by the formula (I) can be used singly for the preparation of recording materials which form red color. Further, they may be used in admixture with blue color chromogenic dyes to form blue black color, or they may be used in admixture with blue color forming chromogenic dyes and green color forming chromogenic dyes to prepare recording materials which form black color. Furthermore, they may be mixed with black color forming chromogenic dyes having color quality slightly tinged with green in order to obtain a color close to real black.

Blue color forming chromogenic dyes which are usable in admixture with the present fluoran compounds include, by way of only illustration but not limitation, those which are listed below.
Crystal violet lactone [3,3-bis(4-dimethylaminophenyl)-6-dimethylaminophthalide],
Benzoyl leucomethylene blue,
5(or 7)-(1-octyl-2-methylindol-3-yl)-5(or 7)-(4-diethylamino-2-ethoxyphenyl)-5,7-dihydrofuro (3,4-b) pyridine-7(or 5)-one.

Green color forming chromogenic dyes which are usable in admixture with the present fluoran compounds include, by way of only illustration but not limitation, those which are listed below.
3-Diethylamino-5-methyl-7-dibenzylaminofluoran,
3-N-isobutyl-ethylamino-7-dibenzylaminofluoran,
3-N-isobutyl-ethylamino-7-phenylaminofluoran,
3-Pyrrolidino-7-dibenzylaminofluoran,
3-Pyrrolidino-7-phenylaminofluoran.

Black color forming chromogenic dyes which are usable in admixture with the present fluoran compounds include, by way of only illustration but not of limitation, those which are listed below.
3-Dimethylamino-6-methyl-7-phenylaminofluoran
3-Diethylamino-6-methyl-7-phenylaminofluoran
3-Diethylamino-6-methyl-7-xylidinofluoran
3-Diethylamino-6-methyl-7-p-butylphenylaminofluoran
3-Diethylamino-6-methyl-7-anisidinofluoran
3-Dipropylamino-6-methyl-7-phenylaminofluoran
3-Di-n-butylamino-6-methyl-7-phenylaminofluoran
3-N-Isopropyl-methylamino-6-methyl-7-phenylaminofluoran
3-N-Isobutyl-ethylamino-6-methyl-7-phenylaminofluoran
3-N-Isopentyl-ethylamino-6-methyl-7-phenylaminofluoran
3-N-Hexyl-ethylamino-6-methyl-7-phenylaminofluoran
3-Dibenzylamino-6-methyl-7-phenylaminofluoran
3-N-Methyl-cyclohexylamino-6-methyl-7-phenylaminofluoran
3-N-Methyl-cyclohexylamino-5-chloro-6-methyl-7-phenylaminofluoran
3-N-n-Pentyl-cyclohexylamino-6-methyl-7-phenylaminofluoran
3-N-Methyl-p-tert-butylcyclohexylamino-6-methyl-7-phenylaminofluoran
3-N-Ethyl-3',3',5'-trimethylcyclohexylamino-6-methyl-7-phenylaminofluoran
3-N-Ethyl-furfurylamino-6-methyl-7-phenylaminofluoran
3-Pyrrolidino-6-methyl-7-phenylaminofluoran
3-Piperidino-6-methyl-7-toluidinofluoran
3-Morpholino-6-methyl-7-p-butylphenylaminofluoran
3-N-Methyl-phenylamino-6-methyl-7-phenylaminofluoran
3-N-Ethyl-phenylamino-6-methyl-7-p-toluidinofluoran
3-N-Ethyl-p-toluidino-6-methyl-7-phenylaminofluoran
3-α-Naphthylamino-6-methyl-7-phenylaminofluoran
3-Dimethylamino-7-N-benzyl-m-trifluoromethylphenylaminofluoran
3-Diethylamino-7-m-trifluoromethylphenylaminofluoran
3-Diethylamino-5-ethyl-7-m-trifluoromethylphenylaminofluoran
3-Diethylamino-5-ethyl-7-m-trifluoromethylphenylaminofluoran
3-Diethylamino-5-chloro-7-m-trifluoromethylphenylaminofluoran
3-Dipropylamino-7-m-trifluoromethylaminofluoran
3-Di-n-butylamino-7-m-trifluoromethylphenylaminofluoran
3-N-Ethyl-p-toluidino-7-m-trifluoromethylphenylaminofluoran
3-Piperidino-7-m-trifluoromethylphenylaminofluoran
3-Pyrrolidino-7-m-trifluoromethylphenylaminofluoran
3-Morpholino-7-m-trifluoromethylphenylaminofluoran
3-N-Methyl-cyclohexylamino-7-m-trifluoromethylphenylaminofluoran
3-N-Benzyl-cyclohexylamino-7-m-trifluoromethylphenylaminofluoran
3-N-Ethyl-furfurylamino-7-m-trifluoromethylphenylaminofluoran
3-N-Ethyl-furfurylamino-6-methyl-7-m-trifluoromethylphenylaminofluoran
3-Diethylamino-7-chlorophenylaminofluoran
3-Diethylamino-7-bromophenylaminofluoran
3-Diethylamino-6-chloro-7-phenylaminofluoran
3-Di-n-butylamino-7-chlorophenylaminofluoran
3-Diethylamino-6-methyl-7-benzylamino-4',5'-benzofluoran
3-N-Methyl-phenylamino-5,6-benzo-7-phenoxyphenylaminofluoran 3-N-Benzyl-phenylamino-5,6-benzo-7-phenoxyphenylamino-3',4',5',6'-tetrachlorofluoran
3-Diethylamino-7-piperidinofluoran
2-Methyl-3-ethylamino-5,6-benzo-7-phenylaminofluoran
3-Diethylamino-6-methyl-7-(α-phenylethylamino)fluoran
3-Dimethylamino-7-(α-phenylethylamino)fluoran
3-N-Butyl-xylidino-6-methyl-7-benzylaminofluoran
3-Pyrrolidino-7-di(p-chlorophenyl)methylaminofluoran
3-Methylpiperidino-7-di(p-chlorophenyl)methylaminofluoran
3-Morpholino-5,6-benzo-7-phenylaminofluoran
3-N-Methyl-cyclohexylamino-5,6-benzo-7-α-naphthylamino-4'-bromofluoran.

In addition to heat-sensitive recording papers and pressure-sensitive copying papers mentioned previously, chromogenic recording materials of this invention which comprise the present fluoran compounds or mixtures thereof with other chromogenic dyes can be used for, e.g., recording papers relying on heat-sensitive transfer, electro thermo heat-sensitive recording papers, papers for electrophotography using toners containing acid substances as developers, ultrasonic wave recording paper, photosensitive printing materials, electron recording paper, stamping materials, stamp ink, typewriter ribbons or the like, but not limiting thereto.

Following the same manner as in the case of known chromogenic dyes, heat-sensitive recording papers using the fluoran compounds of this invention can be prepared in accordance with such procedures as disclosed, for example, in Japanese Patent Publns. Nos. 27579/1964, 4160/1968 and 14039/1970, or Japanese Patent L-O-P Publn. No. 7087/1984. More particularly, heat-sensitive recording papers excellent in color developing property may be prepared by coating, on the surface of papers, a suspension containing finely divided particles of the present fluoran compounds or mixtures thereof with other chromogenic dyes and color developers (acidic substances) in an aqueous solution of water-soluble binders, followed by drying. Furthermore, there may be prepared heat-sensitive recording papers having very high sensitivity when sensitizers are added to the above-mentioned suspension used for the preparation thereof. This suspension may further contain fillers, dispersing agents, colored image stabilizers, anti-oxidants, desensitizers, anti-tack agents, defoaming agents, light stabilizers, optical brighteners or the like.

The color formation upon intimate contact of the present fluoran compound with a color developer takes place also on such substrates other than paper as aforesaid, for example, as synthetic fiber fabric, non-woven fabric, synthetic paper or synthetic resin sheet (e.g., transparent polyethylene sheet).

The color developers include, for exmaple, bisphenol compounds such as bisphenol A, 4,4'-secondary-butylidene-bisphenol, 4,4'-cyclohexylidenebisphenol, 2,2'-dihydroxy-diphenyl and pentamethylene-bis(4-hydroxybenzoate); sulfur containing bisphenol compounds such as 1,7-di(4-hydroxy-phenylthio)-3,5-dioxaheptane; 4-hydroxybenzoic acid esters such as benzyl 4-hydroxybenzoate, ethyl 4-hydroxybenzoate, propyl 4-hydroxybenzoate, isopropyl 4-hydroxybenzoate, butyl 4-hydroxybenzoate, isobutyl 4-hydroxybenzoate, chlorobenzyl 4-hydroxybenzoate, methylbenzyl 4-hydroxybenzoate and diphenylmethyl 4-hydroxybenzoate; hydroxy-sulfones such as 4-hydroxy-4'-methyldiphenylsulfone, 4-hydroxy-4'-isopropoxydiphenylsulfone and 4-hydroxy-4'-butoxydiphenyl-sulfone; 4-hydroxyphthalic acid diesters such as dimethyl 4-hydroxyphthalate, dicyclohexyl 4-hydroxyphthalate and diphenyl 4-hydroxyphthalate; such esters of hydroxynaphthoic acid as 2-hydroxy-6-carboxynaphthalene; and further hydroxyacetophenone, p-phenylphenol, benzyl 4-hydroxyphenylacetate, p-benzylphenol, hydroquinone-mono-benzyl ether or the like.

The water soluble binders include, by way of illustration but not limitation, for example, polyvinyl alcohol, hydroxyethyl cellulose, carboxymethyl cellulose, salts of styrene-maleic anhydride copolymers, styrene-butadiene emulsions, vinyl acetate-maleic anhydride emulsions, polyacrylates, polyacrylamide, starches, casein and gum arabic.

The fillers include, for example, clay, talc, kaolin, satin white, titanium oxide, calcium carbonate, magnesium carbonate, barium sulfate, magnesium silicate and aluminum silicate, etc.

The sensitizers include, for example, higher fatty acid amides such as; benzamide, stearic anilide, acetoacetic anilide, thioacetoanilide; esters such as dimethyl phthalate, dibenzyl terephthalate, dibenzyl isophthalate; diethers of bisphenol S, e.g., 4,4'-dimethoxydiphenylsulfone, 4-iso-propoxy-4'-n-butoxydiphenylsulfone, 4,4'-dibutoxydiphenylsulfone, 4,4'-di-n-(or iso-) pentyloxydiphenylsulfone and the like; diphenylamine, carbazole, 2,3-di-m-tolylbutane, 4-benzylbiphenyl, 4,4'-dimethylbiphenyl and di-β-naphthylphenylenediamine.

The dispersing agents include, for example, sulfosuccinic acid esters such as dioctyl sodium sulfosuccinate; sodium dodecylbenzenesulfonate; sodium lauryl sulfonate; and salts of fatty acid. The colored image stabilizers include, for example, salicyclic acid derivatives, metal salts (particularly zinc salt) of oxynaphthonic acid derivatives and other water-insoluble zinc compounds. The antioxidants include, for example, 2,2'-methylenebis(4-methyl-6-tert-butylphenol), 2,2'-methylenebis(4-ethyl-6-tert-butylphenol), 4,4'-propyl methylene-bis(3-methyl-6-tertbutylphenol) and 4,4'-thiobis(2-tert-butyl-5-methylphenol). The desensitizers include, for example, aliphatic higher alcohols, polyethylene glycol and guanidine derivatives. The anti-tack agents include, for example, stearic acid, zinc stearate, calcium stearate, carnauba wax, paraffin wax and ester wax, etc.

Following substantially the same manner as in the case of conventional fluoran compounds, the fluoran compounds of this invention can be used to prepare pressure-sensitive copying papers in accordance with such procedures as disclosed in U.S. Pat. Nos. 2,548,365, 2,548,366, 2,800,457 and 2,800,458, Japanese Patent L-O-P Publn. No. 112041/1983 or 139738/1983. Developers may be those as previously known, for example, inorganic acidic substances such as acid clay, activated clay, attapulgite, bentonite, colloidal silica, aluminum silicate, magnesium silicate, zinc silicate, tin silicate, calcined kaolin and talc; aliphatic carboxylic acids such as oxalic acid, maleic acid, tartaric acid, citric acid, succinic acid and stearic acid; aromatic carboxylic acids such as benzoic acid, p-tert-butylbenzoic acid, phthalic acid, gallic acid, salicyclic acid, 3-isopropylsalicyclic acid, 3-phenylsalicyclic acid, 3-cyclohexylsalicyclic acid, 3,5-di-tert-butylsalicyclic acid, 3-methyl-5-benzylsalicyclic acid, 3-phenyl-5-(2,2-dimethylbenzyl)salicyclic acid, 3,5-di-(2-methylbenzyl) salicyclic acid and 2-hydroxy-1-benzyl-3-naphthoic acid; salts of these aromatic carboxylic acids with such metals as zinc, magnesium, aluminum, titanium and the like; phenol resin type developers such as p-phenyl-phenol-formalin resins and p-butylphenol-acetylene resins; and mixtures of these phenol resin type developers and the above-mentioned metal salts of aromatic carboxylic acids.

The fluoran compounds of this invention can be used in heat-sensitive transfer in accordance with such procedures as disclosed in Japanese Patent L-O-P Publns. Nos. 212985/1983, 33185/1984, 42995/1984 or 225986/1984 in electro thermo heat-sensitive recording papers in accordance with such procedures, for example, as dislcosed in Japanese Patent L-O-P Publns. Nos. 96137/1973, 101935/1973 or 11344/1974, and in electrophotography in accordance with such procedures, for example, as disclosed in Japanese Patent L-O-P Publns. Nos. 24530/1977 or 56932/1977.

The fluoran compounds of this invention can be used, furthermore, in photosensitive recording papers in accordance with such procedures, for exmple, as disclosed in Japanese Patent Publns. Nos. 24188/1963, 10550/1970 and 45978/1974, Japanese Patent L-O-P Publns. Nos. 80120/1975, 126228/1975, 141633/1975 or 147829/1979; in ultrasonic wave recording papers in accordance with a procedure as disclosed in French Pat. No. 2,120,922; in electron recording papers in accordance with a procedure as disclosed in Belgian Pat. No. 7,959,986; in electrostatic recording papers in accordance with a procedure as disclosed in Japanese Patent Publn. No. 3932/1974; and in photosensitive printing materials in accordance with a procedure as disclosed in Japanese Patent L-O-P Publn. No. 12104/1973.

In addition to the applications as mentioned above, the fluoran compounds of this invention can also be used as a color forming component in a composition which color change occurs reversibly (color⇌the colorless) under the influence of temperature as disclosed, for example in Japanese Patent L-O-P Publns. Nos. 75991/1975 and 219289/1985, by using in admixture therewith one or more compounds selected from a compound having a phenolic hydroxyl group and the metal salts thereof, an aromatic carboxylic acid and the metal salts thereof, an aliphatic carboxylic acid of 2 to 5 carbon atoms and the metal salts thereof, and an acid phosphoric ester and the metal salts thereof, and one or more compounds selected from alcohols, esters, ketones, ethers and acid amides. The compound having a phenolic hydroxyl group includes the phenolic compounds used as the color developer in the heat-sensitive recording papers or the phenol resins used as the color developer in the pressure-sensitive recording papers, but not limiting thereto. Also, the metal salts of said compound include salts of calcium, magnesium, zinc, aluminium, tin, titanium, etc., but not limiting thereto. The aromatic and aliphatic carboxylic acids include benzoic acid, toluic acid, p-tert.-butylbenzoic acid, chlorobenzoic acid, gallic acid, phthalic acid, naphthoic acid, maleic acid, fumaric acid, and the like, and the metal salts thereof include salts of calcium, magnesium, zinc, aluminum, tin, titanium and the like, but not limiting thereto. The acid phosphoric ester includes those in which a phosphate group is attached to an alkyl group which may be branched, an alkenyl group, an alkynyl group, a cycloalkyl group and an aryl group, and the derivatives thereof. The alcohols include a monohydric alcohol such as octyl alcohol, nonyl alcohol, decyl alcohol, lauryl alcohol, myristyl alcohol, cetyl alcohol, palmityl alcohol, stearyl alcohol, dococyl alcohol, oleyl alcohol and benzyl alcohol, and a polyhydric alcohol such as ethylene glycol, diethylene glycol, polyethylene glycol, polypropylene glycol, pentaerythritol and sorbitol. The esters include methyl stearate, butyl stearate, triglyceride of 12-hydroxystearic acid, lauryl myristate, octyl caproate, insect wax and the like. The ketones include diisobutyl ketone, acetophenone, diphenyl ketone and the like. The acid amides include caprylamide, laurylamide, myristylamide, palmitylamide, stearylamide, oleylamide, stearylanilide and the like, but not limiting thereto.

The following exmaples (preparative and use examples) and comparative examples are presented, but the present invention is not limited thereto.

EXAMPLE 1

(Preparative Example)

20.0 g of o-(4-N-isobutyl-ethylamino-2-hydroxybenzoyl)benzoic acid and 8.4 g of 4-chloro-3-methylphenol were added to 110 g of 85% sulfuric acid and continued to stir at temperatures of 120°–125° C. for 4 hours, cooled, and poured into iced water. The reaction product was precipitated with addition of a caustic soda solution. The precipitate was removed by filtration, washed with water, heated while stirring together with 88 ml of water, 5 g of caustic soda and 300 ml of toluene, refluxed for 30 minutes, and the mixture was then cooled and allowed to stand. After removal of an aqueous phase, the toluene phase was washed with a 3.5% aqueous caustic soda solution and water, small amounts of precipitate formed was filtered out, 250 ml of toluene was distilled off, and the residue was cooled. Crystals precipitated were removed by filtration, washed with small amounts of toluene, and then dried to give 20.1 g of 3-N-isobutyl-ethylamino-6-methyl-7-chlorofluoran as pale orange white fine crystals, m.p. 186.2°–187.8° C.

EXAMPLE 2

(Preparative Example)

Substantially the same procedure described in Example 1 was repeated except that 7.5 g of 4-chlorophenol were used in place of the 4-chloro-3-methylphenol, to prepare 19.0 g of 3-N-isobutylethylamino-7-chlorofluoran (compound 2) as slight orange white fine crystals, m.p. 149.1°–150.6° C.

EXAMPLES 3–6

(Preparative Examples)

Substantially the same procedure as in Example 1 was repeated except that in place of the 4-chloro-3-methylphenol, there were used, respectively;

| 3,4-dichlorophenol | 9.6 g or |
| 4-tert-pentylphenol | 9.6 g or |
| β-naphthol | 8.5 g or |
| 6-bromo-2-naphthol | 13.1 g, | to prepare the following compounds, respectively;
21.4 g of 3-N-isobutyl-ethylamino-6,7-dichlorofluoran (compound 3) (m.p. 155.6°–158.0° C., pale peach white fine crystals),
11.7 g of 3-N-isobutyl-ethylamino-7-tert-pentylfluoran (compound 4) (m.p. 185°–186.4° C., pale peach white fine crystals), 17.5 g of 3-N-isobutyl-ethylamino-7,8-benzofluoran (compound 5) (m.p. 192.7°–193.7° C., slightly orange white fine crystals), and 21.4 g of a fluoran compound (compound 6) of the formula,

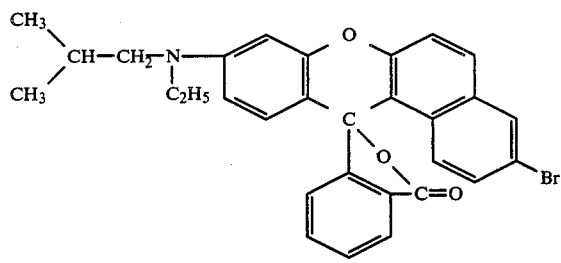

(m.p. 188.0°–189.8° C., pale peach white fine crystals)

EXAMPLE 7

(Preparative Example)

20.0 g of o-(4-N-isopentyl-ethylamino-2-hydroxybenzoyl)benzoic acid and 8.0 g of 4-chloro-3-methylphenol was added to 120 g of 85% sulfuric acid and continued to stir at temperatures of 120°–125° C. for 4 hours. Thereafter, substantially the same treatment as in Example 1 gave 21.8 g of 3-N-isopentyl-ethylamino-6-methyl-7-chlorofluoran (compound 7) as pale peach crystals, m.p. 156.5°–159.0° C.

EXAMPLE 8

(Preparative Example)

Substantially the same procedure as in Example 7, was repeated except that 7.2 g of 4-chlorophenol were used in place of the 4-chloro-3-methylphenol, to prepare 21.5 g of 3-N-isopentyl-ethylamino-7-chlorofluoran (compound 8) as slight peach white crystals, m.p. 149.0°–151.0° C.

EXAMPLE 9

(Preparative Example)

Substantially the same procedure as in Example 1 was repeated but using 7.2 g of 3-ethylphenol in place of the 4-chloro-3-methylphenol. Even after distilling off the toluene, however, no crystal of the end product, 3-N-isobutylethylamino-6-ethylfluoran was precipitated out, leaving only a liquid product as a residue, and therefore the residue was subjected to purification by thin-layer chromatography. That is, using a thin-layer plate, Art. 5745 of Merk Co., Ltd. for chromatography, the residue was developed with chloroform:ethyl acetate (3:1) as a developing solvent. The portions developed in red color were scraped and extracted with methanol:toluene (1:1). The solvent was distilled off, and the residue was again extracted with toluene, and toluene was substantially distilled off but no crystal was obtained from the residue. The residue was subjected again to the above-mentioned thin-layer chromatography and to the steps that followed, but no crystal was obtained. Therefore recrystallizations of the residue from isopropyl alcohol, toluene, n-hexane, ligroin and methanol were tried, but it was not successful leaving only a substance which was slightly yellowish and viscous at ordinary temperatures and which solidified at a temperature of −20° C. Analysis of this substance by NMR indicated that the substance is the end product of 3-N-isobutyl-ethylamino-6-ethylfluoran (compound 9). The NMR spectrum is shown in the FIGURE.

EXAMPLE 10

(Preparative Example)

Substantially the same procedure as in Example 1 was repeated but using 8.5 g of α-naphthol in place of the 4-chloro-3-methylphenol, to prepare 14.9 g of 3-N-isobutylethylamino-5,6-benzofluoran (compound 10) as white fine crystals, m.p. 158.8°–160.7° C.

EXAMPLE 11

(Heat-sensitive recording paper)

3.5 g of 3-N-isobutyl-ethylamino-6-methyl-7-chlorofluoran, 41.5 g of a 15% aqueous solution of polyvinyl alcohol (KURARAY-105, produced and sold by Kuraray Co., Ltd.), 15.0 g of clay (UW-90, produced and sold by Engelhard) and 40.0 g of water were charged, together with 150 g of glass beads (1–1.5 mm in diameter), into a 250 ml polyethylene bottle, the bottle was sealed and placed to a paint conditioner manufactured and sold by Red Devil Co. The bottle was shaked at a rate of 630 times/min for 5 hours, and thereafter the beads were removed to obtain an aqueous suspension of 3-N-isobutyl-ethylamino-6-methyl-7-chlorofluoran (suspension A).

Separately, 10.5 g of bisphenol A as a color developer, 41.5 g of a 15% aqueous solution of polyvinyl alcohol (same as above), 8.0 g of clay (same as above) and 40.0 g of water were charged, together with 150 g of glass beads (same as above), into a 250 ml polyethylene bottle, and the bottle was sealed. The bottle was shaked with the paint conditioner at a rate of 630 times/min for 8 hours, and the glass beads were removed therefrom to prepare an aqueous suspension of bisphenol A (suspension B).

The suspensions A and B, each 10 g, were mixed together, and the mixture was stirred for 20 minutes to prepare a coating liquid.

This coating liquid was coated with wire rod No. 12 on a white paper and dried for 2 minutes with air kept at 60° C. to prepare heat-sensitive recording paper I.

The coated surface of the heat-sensitive recording paper thus obtained was heated (1 kg/cm$^2$) with a heat gradient tester (manufactured and sold by Toyo Seiki Seisakusho K.K.) at a temperature of 95° C., 100° C., 110° C., 120° C., 130° C., 150° C. and 180° C. for 5 seconds and thereby to develop color. The color hue was vermilion. The color density was measured with a Macbeth reflective densitometer (a filter used was Wratten #58). The measured values are shown in Table 2 above.

COMPARATIVE EXAMPLE 1

Substantially the same procedure as in Example 11 was repeated except that 3-diethylamino-6-methyl-7-chlorofluoran was used in place of the 3-N-isobutyl-ethylamino-6-methyl-7-chlorofluoran used in Example 11, to prepare heat-sensitive recording paper (II) which was then allowed to develop color (vermilion). The density of the developed color was measured. The measured values are shown in Table 2 above.

EXAMPLE 12

(Heat-sensitive recording paper)

Substantially the same procedure as in Example 11 was repeated except that 3.5 g of 3-N-isobutyl-ethylamino-7-chlorofluoran was used as a fluoran compound and benzyl p-hydroxybenzoate was used as a color developer, to prepare heat-sensitive recording paper (III) which was allowed to develop color (color development temperature: 85° C., 90° C., 95° C., 100° C., 110° C., 120° C. and 130° C.) (The hue of the developed color was vermilion). The density of the developed color was measured. The measured values are shown in Table 3 above.

COMPARATIVE EXAMPLE 2

Except that 3-diethylamino-7-chlorofluoran was used in place of the 3-N-isobutyl-ethylamino-7-chlorofluoran used in Example 12, substantially the same procedure as in Example 12 was repeated to prepare heat-sensitive recording paper (IV) which was allowed to develop color (vermilion). The density of the developed color was measured. The measured values are shown in Table 3 above.

EXAMPLE 13

(Heat-sensitive recording paper)

Except that in place of the fluoran compound, 3.5 g of 3-N-isobutyl-ethylamino-7-chlorofluoran used in Example 12, a mixture of 3.32 g of 3-N-methyl-cyclohexylamino-6-methyl-7-phenylaminofluoran (black color forming chromogenic dye) and 0.18 g of 3-N-isobutyl-ethylamino-7-chlorofluoran was used, substantially the same procedure as in Example 12 was repeated to prepare a heat-sensitive recording paper which was then heated with a heat gradient tester at a temperature of 130° C. for 5 seconds to develop color.

Furthermore, a heat-sensitive recording paper was prepared and allowed to develop color in the manner similar to the above, but using 3.5 g of 3-N-methyl-cyclohexylamino-6-methyl-7-phenylaminofluoran with no use of 3-N-isobutylethylamino-7-chlorofluoran.

In the heat-sensitive recording paper with no use of 3-N-isobutyl-ethylamino-7-chlorofluoran, the color developed was slightly greenish black, whereas the color developed in the heat-sensitive recording paper using said fluoran compound was black free from greenish tinge.

EXAMPLE 14

(Heat-sensitive recording paper)

Except that in place of the fluoran compound, 3.5 g of 3-N-isobutyl-ethylamino-7-chlorofluoran used in Example 12, a mixture of 2.95 g of 3-diethylamino-6-chloro-7-phenylaminofluoran (black color forming chromogenic dye) and 0.55 g of 3-N-isobutyl-ethylamino-7-chlorofluoran was used, substantially the same procedure as in Example 12 was repeated to prepare a heat-sensitive recording paper which was then heated with a heat gradient tester at a temperature of 130° C. for 5 seconds to develop color.

Furthermore, a heat-sensitive recording paper was prepared and allowed to develop color in the manner similar to the above, but using 3.5 g of 3-diethylamino-6-chloro-7-phenylaminofluoran without using at all 3-N-isobutyl-ethylamino-7-chlorofluoran.

In the heat-sensitive recording paper with no use of 3-N-isobutyl-ethylamino-7-chlorofluoran, the color developed was black with somewhat strong greenish tinge, whereas in the heat-sensitive recording paper using said fluoran compound, the color developed was black substantially free from greenish tinge.

EXAMPLE 15

(Pressure-sensitive copying paper)

1.0 g of 3-N-isobutyl-ethylamino-7,8-benzofluoran was dissolved in 20 g of alkyl naphthalene at 90° C. to obtain a solution (Solution A). Separately, 2.0 g of gelatin (isoelectric point 8.0) and 0.5 g of carboxymethyl cellulose were completely dissolved in 120 ml of water to obtain a solution (Solution B). Subsequently, Solutions A and B were mixed at 50°-60° C., and stirred at high speed to emulsify, and the emulsified product was adjusted to pH 8.5–9.0. Thereafter, the emulsified product was stirred at high speed for 20 minutes, the pH was gradually lowered to pH 3.8 with dilute acetic acid, and cooled with stirring to 5°–10° C. To the cooled emulsified product was added 6 g of a 37% aqueous formalin solution, and the mixture was stirred at 10°–20° C. for further 1 hour.

Subsequently, the emulsion was adjusted to pH 9.0 with an aqueous sodium hydroxide solution (5%). This emulsion was gently stirred for several hours to obtain an emulsion containing very fine microcapsules covered with gel films of carboxymethyl cellulose and gelatin, each capsule containing inside an alkyl naphthalene solution of 3-N-isobutyl-ethylamino-7,8-benzofluoran. This emulsion was coated on a paper and dried to prepare a top sheet of pressure-sensitive paper. Separately, phenol-formalin resin was coated on a paper and dried to prepare a bottom sheet. The coated surface of the top sheet was placed on the coated surface of the bottom sheet, and letters were written on the uncoated surface of the top sheet, whereby deep pink-colored letters appeared very quickly on the coated surface of the bottom sheet.

With the bottom sheet for pressure-sensitive copying paper coated with clay in place of the phenol-formalin resin, deep pink-colored letters appeared likewise.

EXAMPLE 16

(Pressure-sensitive copying paper)

There were mixed 3.0 g of 3-N-isobutyl-ethylamino-6-methyl-7-chlorofluoran, 6.0 g of 3-diethylamino-5-methyl-7-dibenzylaminofluoran (green color forming chromogenic dye), 0.5 g of crystal violet lactone [3,3-bis(4-dimethylaminophenyl)-6-dimethylaminophthalide](blue color forming chromogenic dye) and 0.5 g of benzoyl leucomethylene blue (blue color forming chromogenic dye). This mixture (4.0 g) was mixed with 50.0 g of alkyl diphenylmethane (Hizole SAS 296, produced and sold by Nisseki Kagaku K.K.) and 36.0 g of diisopropyl naphthalene (KMC-113, produced and sold by Kureha Kagaku K.K.), and heated to dissolve and stirred at 90° C. for 10 minutes and cooled (Solution A).

Separately, 30.0 g of a 10% aqueous solution of a sulfonic acid-modified polyvinyl alcohol (Gosenol CKS-50, produced and sold by The Nippon Synthetic Chemical Industry Co., Ltd., average polymerization degree about 300, saponification degree 97%, and modification degree 10 mol %), 15.0 g of a 10% aqueous solution of ethylene-maleic anhydride copolymer (EMA-31, produced and sold by Monsanto Co.) and 67.5 ml of water were mixed and added with further 5.0 g of urea and 0.5 g of resorcinol to prepare a solution. The solution was adjusted to pH 3.4 with a 20% aqueous caustic soda solution (Solution B).

Solution A was added to Solution B and stirred with a homomixer at 9,000 rpm for 2 minutes to prepare an emulsion. The emulsion was then charged with 14.0 g of a 35% aqueous formalin solution and stirred at 9,000 rpm for 3 minutes. Thereafter, the emulsion was stirred at 8000 rpm and elevated temperatures of 60°–65° C. for 60 minutes. The stirring with the homomixer was ceased, the emulsion was cooled to 40° C. and adjusted to pH 7.5 with the addition of 28% ammonia water to prepare a suspension of microcapsules.

27.0 g of this suspension (kept at a temperature below 30° C.), 3.5 g of wheat starch, 8.5 g of a 8% wheat starch solution and 34.0 ml of water were mixed and stirred with a stirrer at room temperatures for 30 minutes to prepare a coating solution.

The coating solution was coated with a wire bar No. 12 on a white paper and dried for 3 minutes with air kept at 60° C. to prepare a top sheet of pressure-sensitive copying paper.

The coated surface of the top sheet was placed in the same manner as in Example 15 on the coated surface of the bottom sheet, and letters were written on the surface of the top sheet, whereby black-colored letters appeared very quickly on the coated surface of the bottom sheet.

EXAMPLE 17

(Pressure-sensitive copying paper)

A top sheet of pressure-sensitive copying paper was prepared in substantially the same manner as in Example 16, but using 4.0 g of 3-N-isobutyl-ethylamino-5,6-benzofluoran in place of 4.0 g of the mixture of 4 kinds of chromogenic dyes used in Example 16. This top sheet was placed on the bottom sheet in the same manner as in Example 15, and letters were written on the surface of the top sheet, whereby pink-colored letters appeared very quickly on the coated surface of the bottom sheet.

EXAMPLE 18

(Use Example)

In 100 ml of toluene were dissolved 0.4 g of 3-N-methyl-cyclohexylamino-6-methyl-7-phenylaminofluoran, 0.15 g of 3-N-isobutyl-ethylamino-6-methyl-7-chlorofluoran, 0.35 g of 3-diethylamino-5-methyl-7-dibenzylaminofluoran and 0.1 g of benzoyl leucomethylene blue.

This toluene solution was applied to a writing brush, and a drawing was depicted with the brush on the clay coated surface of a bottom sheet for pressure-sensitive copying paper, whereby a beautiful black drawing appeared thereon.

EXAMPLE 19

(Heat transfer paper)

10.0 g of 3-N-isobutyl-ethylamino-7,8-benzofluoran, 1.0 g of finely divided silica, and 100 g of polystyrene resin (m.p. 100° C.) and 100 g of methyl ethyl ketone were charged with 100 g of glass beads into a 250 ml polyethylene bottle, and the bottle was sealed and shaken at a rate of 630 times/min. with a paint conditioner for 5 hours, and the glass beads were then, removed therefrom to prepare a suspension containing the fluoran compound.

Separately, 20.0 g of benzyl 4-hydroxybenzoate, 10.0 g of finely divided silica, 3.0 g of polyvinyl alcohol and 100 g of water were charged together with 100 g of glass beads into a 250 ml polyethylene bottle, and the bottle was sealed and shaken at a rate of 630 times/min. with a paint conditioner for 8 hours. Thereafter, the glass beads were removed to prepare a color developer suspension.

The above-mentioned fluoran compound containing suspension was coated with a wire rod on a condenser paper and then dried to prepare a transfer sheet, and the color developer suspension was coated with a wire rod on a high quality paper and then dried to prepare a receiving paper.

The coated surface of the receiving sheet was placed on the coated surface of the transfer paper, and the transfer sheet was heated from the back side with a heat pen. A clear pink-colored image appeared on the coated surface of the receiving sheet corresponding to the heated portion of the transfer sheet.

EXAMPLE 20

(Thermo-sensitive, reversible color changing composition)

10.0 g of 3-N-isobutyl-ethylamino-7,8-benzofluoran, 10.0 g of bisphenol A and 250 g of cetyl alcohol were mixed, heated to about 80° C. and dissolved to prepare a pink solution. Cooling of the solution resulted in substantially colorless at approximately 40° C.

EXAMPLE 21

(Microcapsule containing the composition of Example 20)

In 30 g of color changing composition prepared in Example 20 were dissolved under heat 6.0 g of styrene monomer, 0.6 g of divinylbenzene and 10 mg of benzoyl peroxide. The solution was added dropwise to 150 g of 2% aqueous solution of gum arabic and stirred so as to provide fine droplets. Continuous stirring of 5 hours at about 60° C. gave an emulsion of microcapsule containing the above composition. The emulsion was coated onto a white paper and dried to prepare a thermo-sensitive, reversible color changing material. The material was colorless at temperatures lower than about 40° C. and formed beautiful pink color at temperatures higher than 40° C.

What is claimed is:

1. A chromogenic recording material which comprises a substrate, a fluoran compound of the formula

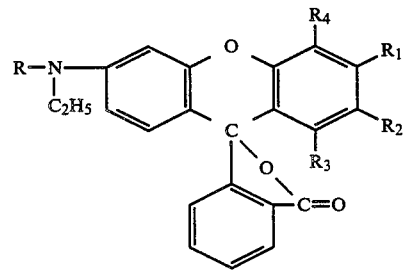

wherein R is an isobutyl or isopentyl group, $R_1$ is hydrogen, a halogen atom or an alkyl group, $R_2$ is hydrogen, a halogen atom or an alkyl group, $R_3$ is hydrogen, and R$_4$ is hydrogen, or R$_4$ and R$_1$ as well as R$_2$ and R$_3$, when taken together with the carbon atoms to which they are attached, form a substituted or unsubstituted benzene ring wherein the substituent is a halogen atom, as a color forming component, and a color developer capable of causing the color formation of the fluoran compound.

2. The chromogenic recording material of claim 1 wherein the color forming component is selected from 3-N-isobutyl-ethylamino-6-methyl-7-chlorofluoran, 3-N-isobutyl-ethylamino-7-chlorofluoran, 3-N-isobutyle-thylamino-7,8-benzofluoran, 3-N-isopentyl-ethylamino-6-methyl-7-chlorofluoran or 3-N-isopentyl-ethylamino-6-chlorofluoran.

3. The chromogenic recording material of claim 2 which firther comprises as a color forming component at least one of black color forming chromogenic fluoran compounds.

4. The chromogenic recording material of claim 3 which is heat-sensitive recording papers.

5. The chromogenic recording material of claim 3 which is pressure-sensitive recording papers.

6. The chromogenic recording material of claim 3 which is heat-transfer chromogenic recording papers.

7. The chromogenic recording material of claim 8 which is heat-transfer chromogenic recording papers.

8. The chromogenic recording material of claim 2 which further comprises as a color forming component at least one of a green color forming chromogenic compound and a blue color forming chromogenic compound.

9. The chromogenic recording material of claim 8 which is heat-sensitive recording papers.

10. The chromogenic recording material of claim 8 which is pressure-sensitive recording papers.

11. The chromogenic recording material of claim 2 which is heat-sensitive recording papers.

12. The chromogenic recording material of claim 2 which is pressure-sensitive recording papers.

13. The chromogenic recording material of claim 2 which is heat-transfer chromogenic recording papers.

14. The chromogenic recording material of claim 1 wherein the color developer is selected from bisphenol compounds, 4-hydroxybenzoic acid esters, hydroxysulfones or 4-hydroxyphthalic acids.

15. The chromogenic recording material of claim 14 which further comprises as a color forming component at least one of black color forming chromogenic fluoran compounds.

16. The chromogenic recording material of claim 15 which is heat-sensitive recording papers.

17. The chromogenic recording material of claim 15 which is pressure-sensitive recording papers.

18. The chromogenic recording material of claim 15 which is heat-transfer chromogenic recording papers.

19. The chromogenic recording material of claim 14 which further comprises as a color forming component at least one of a green color forming chromogenic compound and a blue color forming chromogenic compound.

20. The chromogenic recording material of claim 19 which is heat-sensitive recording papers.

21. The chromogenic recording material of claim 19 which is pressure-sensitive recording papers.

22. The chromogenic recording material of claim 19 which is heat-transfer chromogenic recording papers.

23. The chromogenic recording material of claim 14 which is heat-sensitive recording papers.

24. The chromogenic recording material of claim 14 which is heat-transfer chromogenic recording papers.

25. The chromogenic recording material of claim 1 wherein the color developer is selected from inorganic acid substances, aliphatic carboxylic acids, aromatic carboxylic acids, metal salts of aromatic carboxylic acids, phenol resin type developers (such as p-phenyl-phenol-formalin resin and p-butyl-phenol-acetylene resin), or mixtures of phenol resin type developers and metal salts of aromatic carboxylic acids.

26. The chromogenic recording material of claim 25 which further comprises as a color forming component at least one of black color forming chromogenic fluoran compounds.

27. The chromogenic recording material of claim 26 which is heat-sensitive recording papers.

28. The chromogenic recording material of claim 26 which is pressure-sensitive recording papers.

29. The chromogenic recording material of claim 26 which is heat-transfer chromogenic recording papers.

30. The chromogenic recording material of claim 25 which is pressure-sensitive recording papers.

31. The chromogenic recording material of claim 25 which further comprises as a color forming component at least one of a green color forming chromogenic compound and a blue color forming chromogenic compound.

32. The chromogenic recording material of claim 31 which is heat-sensitive recording papers.

33. The chromogenic recording material of claim 31 which is pressure-sensitive recording papers.

34. The chromogenic recording material of claim 31 which is heat-transfer chromogenic recording papers.

35. The chromogenic recording material of claim 25 which is heat-transfer chromogenic recording papers.

36. The chromogenic recording material of claim 1 wherein the substrate is selected from the paper synthetic fiber fabric, synthetic paper or synthetic resin sheet.

37. The chromogenic recording material of claim 36 which further comprises as a color forming component at least one of black color forming chromogenic fluoran compounds.

38. The chromogenic recording material of claim 37 which is heat-sensitive recording papers.

39. The chromogenic recording material of claim 37 which is pressure-sensitive recording papers.

40. The chromogenic recording material of claim 37 which is heat-transfer chromogenic recording papers.

41. The chromogenic recording material of claim 36 which is heat-sensitive recording papers.

42. The chromogenic recording material of claim 36 which is pressure-sensitive recording papers.

43. The chromogenic recording material of claim 36 which further comprises as a color forming component at least one of a green color chromogenic compound and a blue color forming chromogenic compound.

44. The chromogenic recording material of claim 43 which is heat-sensitive recording papers.

45. The chromogenic recording material of claim 43 which is pressure-sensitive recording papers.

46. The chromogenic recording material of claim 43 which is heat-transfer chromogenic recording papers.

47. The chromogenic recording material of claim 36 which is heat-transfer chromogenic recording papers.

48. The chromogenic reading material of claim 1 which further comprises as a color forming component at least one of the black color forming chromogenic fluoran compounds.

49. The chromogenic recording material of claim 48 which is heat-sensitive recording papers.

50. The chromogenic recording material of claim 48 which is pressure-sensitive recording papers.

51. The chromogenic recording material of claim 48 which is heat-transfer chromogenic recording papers.

52. The chromogenic recording material of claim 1 which further comprises as a color forming component at least one of a green color forming chromogenic compound.

53. The chromogenic recording material of claim 52 which is heat-sensitive recording papers.

54. The chromogenic recording material of claim 52 which is pressure-sensitive recording papers.

55. The chromogenic recording material of claim 52 which is heat-transfer chromogenic recording papers.

56. The chromogenic recording material of claim 1 which is heat-sensitive recording papers.

57. The chromogenic recording material of claim 1 which is pressure-sensitive recording papers.

58. The chromogenic recording material of claim 1 which is heat-transfer chromogenic recording papers.

* * * * *